US012067206B2

(12) United States Patent
Shuai et al.

(10) Patent No.: US 12,067,206 B2
(45) Date of Patent: Aug. 20, 2024

(54) DISPLAY MODULE AND MOBILE TERMINAL

(71) Applicant: WUHAN CHINA STAR OPTOELECTRONICS TECHNOLOGY CO., LTD., Hubei (CN)

(72) Inventors: Chuan Shuai, Hubei (CN); Rui He, Hubei (CN); Guowei Zha, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 17/622,753

(22) PCT Filed: Dec. 15, 2021

(86) PCT No.: PCT/CN2021/138366
§ 371 (c)(1),
(2) Date: Dec. 24, 2021

(87) PCT Pub. No.: WO2023/097788
PCT Pub. Date: Jun. 8, 2023

(65) Prior Publication Data
US 2024/0036693 A1   Feb. 1, 2024

(30) Foreign Application Priority Data

Dec. 3, 2021 (CN) .......................... 202111467396.7

(51) Int. Cl.
*G06F 3/046* (2006.01)
*G06F 3/0354* (2013.01)

(52) U.S. Cl.
CPC .......... *G06F 3/046* (2013.01); *G06F 3/03545* (2013.01)

(58) Field of Classification Search
CPC ............................. G06F 3/046; G06F 3/03545
See application file for complete search history.

(56) References Cited

U.S. PATENT DOCUMENTS

| 6,744,426 B1* | 6/2004 | Okamoto | G06F 3/03545 345/174 |
| 9,410,824 B2* | 8/2016 | Kobori | H01Q 7/00 |

(Continued)

FOREIGN PATENT DOCUMENTS

| CN | 202049470 U | 11/2011 |
| CN | 102646005 A | 8/2012 |

(Continued)

OTHER PUBLICATIONS

Chinese Office Action issued in corresponding Chinese Patent Application No. 202111467396.7 dated Apr. 23, 2023, pp. 1-7.

(Continued)

*Primary Examiner* — Bryan Earles
(74) *Attorney, Agent, or Firm* — PV IP PC; Wei Te Chung; Zhigang Ma

(57) ABSTRACT

A display module and a mobile terminal are provided, which includes a light-emitting backplane. The light-emitting backplane includes a substrate, and an electromagnetic induction layer and a light-emitting component layer sequentially arranged on the substrate. The light-emitting component layer includes a plurality of light-emitting components distributed in an array along a first direction and a second direction intersecting with each other. The electromagnetic induction layer includes first electromagnetic induction coils arranged in the first direction and extending to the second direction and second electromagnetic induction coils arranged in the second direction and extending to the first direction.

18 Claims, 17 Drawing Sheets

(56) References Cited

U.S. PATENT DOCUMENTS

| | | | |
|---|---|---|---|
| 9,886,158 B2* | 2/2018 | Wang | G06F 3/04164 |
| 2015/0277591 A1 | 10/2015 | Lu et al. | |
| 2015/0277633 A1* | 10/2015 | Jiang | G02F 1/133512 |
| | | | 345/174 |
| 2016/0357306 A1* | 12/2016 | Zou | G06F 3/0412 |
| 2018/0059461 A1* | 3/2018 | Katsuta | G06F 3/04164 |
| 2020/0020751 A1* | 1/2020 | Cho | H10K 59/131 |
| 2022/0113821 A1* | 4/2022 | Suzuki | G06F 3/0412 |

FOREIGN PATENT DOCUMENTS

| | | |
|---|---|---|
| CN | 106409872 A | 2/2017 |
| CN | 106980207 A | 7/2017 |
| CN | 108920034 A | 11/2018 |
| CN | 109491555 A | 3/2019 |
| CN | 111240523 A | 6/2020 |
| CN | 111508340 A | 8/2020 |
| CN | 111596487 A | 8/2020 |

OTHER PUBLICATIONS

International Search Report in International application No. PCT/CN2021/138366, mailed on Aug. 29, 2022.
Written Opinion of the International Search Authority in International application No. PCT/CN2021/138366, mailed on Aug. 29, 2022.

* cited by examiner

DISPLAY MODULE AND MOBILE TERMINAL

FIELD OF INVENTION

This application relates to the fields of display technologies, in particular, to display modules and mobile terminals.

BACKGROUND OF INVENTION

With the development of communication technology, electronic devices, such as smartphones, are becoming more and more popular. In the field of small and medium-sized displays, integrated technology has become the current key research and development direction. Namely, how to achieve the integration of panel function through the development of related technologies. Integration can ensure that the thickness of the display panel does not increase while ensuring no loss of functionality. The integrated technologies of display panels can bring many derived additional functions to the display panels, making the display panel gradually transition from a simple display interface to a comprehensive perception and interaction interface.

Currently, touch technology is often integrated into the display panel, such as stylus pen technology, in which the stylus pen technology generally adopts capacitive touch, but capacitive touch requires a large difference in the amount of charge resulting in a larger pen tip, its poor writing experience, high latency, and low precision limit its development in the professional field.

Technical Problem

The embodiments of the present application provide a display module and a mobile terminal, which can improve the touch effect and touch precision through electromagnetic touch technology.

SUMMARY OF INVENTION

Technical Solutions

The present application provides a display module including a light-emitting backplane, wherein the light-emitting backplane includes:

a substrate;

an electromagnetic induction layer arranged on the substrate and configured for receiving an electromagnetic signal;

a light-emitting component layer arranged on the electromagnetic induction layer, and the light-emitting component layer including a plurality of light-emitting components distributed in an array along a first direction and a second direction intersecting with each other;

wherein the electromagnetic induction layer includes a plurality of first electromagnetic induction coils arranged in the first direction and extending to the second direction, and a plurality of second electromagnetic induction coils arranged in the second direction and extending to the first direction.

In an embodiment of the present application, the display module further includes a touch area, each of the first electromagnetic induction coils includes a first end, a second end, and a first winding part connected between the first end and the second end, and located in the touch area, and each first winding part is arranged around a corresponding first electromagnetic induction area;

each of the second electromagnetic induction coils includes a third end, a fourth end, and a second winding part connected between the third end and the fourth end and located in the touch area, and each second winding part is arranged around a corresponding second electromagnetic induction area; and a plurality of the first electromagnetic induction areas are arranged in the touch area along the first direction, a plurality of the second electromagnetic induction areas are arranged in the touch area along the second direction, and any one of the first electromagnetic induction areas and any of the second electromagnetic induction areas are arranged in a cross manner and partially overlapped.

In an embodiment of the present application, two of the first electromagnetic induction areas corresponding to any two adjacent of the first winding parts partially overlap, and two of the second electromagnetic induction areas corresponding to any two adjacent of the second winding parts partially overlap.

In an embodiment of the present application, the first winding part is arranged spirally around one corresponding of the first electromagnetic induction areas, and the second winding part is arranged spirally around one corresponding of the second electromagnetic induction areas, wherein a number of turns of the first winding part around the corresponding first electromagnetic induction area are greater than or equal to 1, and a number of turns of the second winding part around the corresponding second electromagnetic induction area are greater than or equal to 1.

In an embodiment of the present application, the light-emitting component layer includes a plurality of first light-emitting component groups arranged along the first direction and a plurality of second light-emitting component groups arranged along the second direction, each of the first light-emitting component groups includes a plurality of light-emitting components arranged along the second direction, and each of the second light-emitting component groups includes a plurality of the light-emitting components arranged along the first direction; and wherein at least one of the first light-emitting component groups is arranged in each of the first electromagnetic induction areas, and at least one of the second light-emitting component groups is arranged in each of the second electromagnetic induction areas.

In an embodiment of the present application, the light-emitting backplane further includes a plurality of first input terminals and a plurality of first output terminals arranged on the substrate and located on a first side of the electromagnetic induction layer, the first end of each of the first electromagnetic induction coils is connected to a corresponding first input terminal, and the second end of each of the first electromagnetic induction coils is connected to a corresponding first output terminal.

In an embodiment of the present application, the electromagnetic induction layer further includes a second side arranged opposite to the first side, and the first winding part of each of the first electromagnetic induction coils is electrically connected on the second side.

In an embodiment of the present application, the light-emitting backplane further includes a plurality of second input terminals and a plurality of second output terminals arranged on the substrate and located on a third side of the electromagnetic induction layer, the third end of each of the second electromagnetic induction coils is connected to a corresponding second input terminal, and the fourth end of each of the second electromagnetic induction coils is connected to a corresponding second output terminal.

In an embodiment of the present application, the electromagnetic induction layer further includes a fourth side arranged opposite to the third side, and the second winding part of each of the second electromagnetic induction coils is electrically connected on the fourth side.

In an embodiment of the present application, a width of the first electromagnetic induction area near the third side along the first direction is greater than a width of the first electromagnetic induction area near the fourth side along the first direction, and a width of the second electromagnetic induction area near the first side along the second direction is greater than a width of the second electromagnetic induction area near the second side along the second direction.

In an embodiment of the present application, a width of each first winding part along the first direction ranges between greater than or equal to 10 mm and less than or equal to 80 mm; and a width of each second winding part along the second direction is greater than or equal to 10 mm, and less than or equal to 80 mm.

In an embodiment of the present application, the electromagnetic induction layer includes a first wiring sublayer, a second wiring sublayer arranged on the substrate, and an insulating layer arranged between the first wiring sublayer and the second wiring sublayer, wherein the first electromagnetic induction coils are at least located in the first wiring sublayer, the second electromagnetic induction coils are at least located in the second wiring sublayer, and the electromagnetic induction layer further includes light-emitting signal traces arranged in the first wiring sublayer and/or the second wiring sublayer, and the light-emitting signal traces are electrically connected to each of the light-emitting components, respectively.

In an embodiment of the present application, the light-emitting signal trace includes a plurality of first signal traces arranged in the first direction and extending to the second direction, and a plurality of second signal traces arranged in the second direction and extending to the first direction, the first signal traces are located in the first wiring sublayer, the second signal traces are located in the second wiring sublayer, and one of the light-emitting components are connected to a corresponding first signal trace and a corresponding second signal trace.

In an embodiment of the present application, the light-emitting signal trace includes a plurality of third signal traces arranged in the second direction and extending to the first direction, the third signal traces are located in the second wiring sublayer, and one of the light-emitting components are connected to a corresponding third signal trace.

In an embodiment of the present application, the light-emitting backplane further includes a first driving module, and the first electromagnetic induction coils, the second electromagnetic induction coils, and the light-emitting signal traces are electrically connected with the first driving module; and the first electromagnetic induction coils and the second electromagnetic induction coils are driven in a first period of time, the light-emitting signal traces are driven in a second period of time, and the first period of time does not overlap with the second period of time.

In an embodiment of the present application, the light-emitting backplane further includes a second driving module and a third driving module, the first electromagnetic induction coils and the second electromagnetic induction coils are electrically connected with the second driving module, and the light-emitting signal traces are electrically connected with the third driving module; and a driving frequency of the first electromagnetic induction coils and a driving frequency of the second electromagnetic induction coils are both different from a driving frequency of the light-emitting signal traces.

In an embodiment of the present application, the display module further includes a display panel arranged opposite to the light-emitting backplane, and the display panel is arranged on a side of the light-emitting component layer away from the electromagnetic induction layer.

According to the above purpose of the present application, there is provided a mobile terminal, including a display module, wherein the display module includes a light-emitting backplane, and the light-emitting backplane includes:

a substrate;

an electromagnetic induction layer arranged on the substrate and configured for receiving an electromagnetic signal;

a light-emitting component layer arranged on the electromagnetic induction layer, and the light-emitting component layer including a plurality of light-emitting components distributed in an array along a first direction and a second direction intersecting with each other;

wherein the electromagnetic induction layer includes a plurality of first electromagnetic induction coils arranged in the first direction and extending to the second direction, and a plurality of second electromagnetic induction coils arranged in the second direction and extending to the first direction.

In an embodiment of the present application, the display module further includes a touch area, each of the first electromagnetic induction coils includes a first end, a second end, and a first winding part connected between the first end and the second end, and located in the touch area, and each first winding part is arranged around a corresponding first electromagnetic induction area;

each of the second electromagnetic induction coils includes a third end, a fourth end, and a second winding part connected between the third end and the fourth end and located in the touch area, and each second winding part is arranged around a corresponding second electromagnetic induction area; and a plurality of the first electromagnetic induction areas are arranged in the touch area along the first direction, a plurality of the second electromagnetic induction areas are arranged in the touch area along the second direction, and any one of the first electromagnetic induction areas and any of the second electromagnetic induction areas are arranged in a cross manner and partially overlapped.

In an embodiment of the present application, two of the first electromagnetic induction areas corresponding to any two adjacent of the first winding parts partially overlap, and two of the second electromagnetic induction areas corresponding to any two adjacent of the second winding parts partially overlap.

Beneficial Effect

Compared with the conventional art, the present application can improve the touch effect and touch accuracy by configuring a plurality of first electromagnetic induction coils and a plurality of second electromagnetic induction coils in the light-emitting backplane of the display module, which can get the touch coordinates of the display module by sensing the magnetic flux change in different positions of the display module. In addition, the substrate of the light-emitting backplane does not need to transmit light, which has a lot of space for routing the electromagnetic induction coils and does not affect the luminescence of the light-emitting backplane. The present application can save the space of the display module for the display module with an integrated touch function.

DRAWINGS

The technical solutions and other beneficial effects of the present application will be made apparent through the detailed description of the specific embodiments of the present application in combination with the accompanying drawings.

DETAILED DESCRIPTION OF EMBODIMENTS

The technical solutions in the embodiments of the present application will be clearly and completely described below in combination with the accompanying drawings in the embodiments of the present application. It is apparent that the described embodiments are only part of the embodiments of the present application, not all of the embodiments. On the basis of the embodiments of the present application, all other embodiments obtained by those skilled in the art without any creative work belong to the protection scope of the present application.

The following disclosure provides many different embodiments or examples to implement different structures of the present application. In order to simplify the disclosure of the present application, the components and configurations of specific examples are described below. Certainly, those embodiments are merely examples and are not intended to limit the present application. In addition, the present application may duplicate the reference numbers and/or reference letters in different examples, such duplication is for simplicity and clarity and is not indicative of a relationship between the various embodiments and/or configurations discussed. In addition, the present application provides examples of various specific processes and materials, but those skilled in the art can realize that other process applications and/or other materials may be used.

Figure 1:
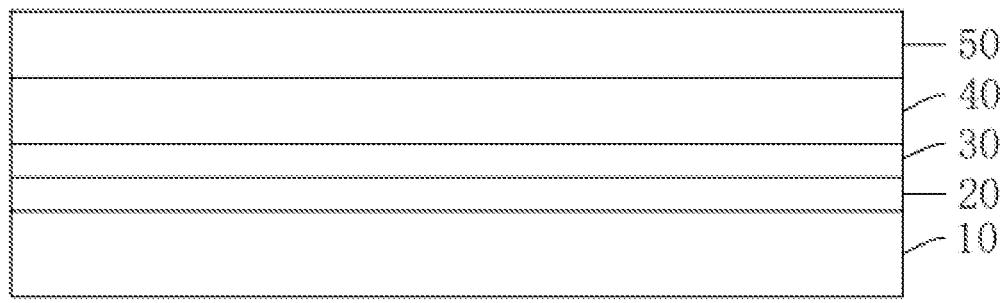
FIG. 1 is a schematic structural view of a display panel provided by an embodiment of the present application.
Figure 2:
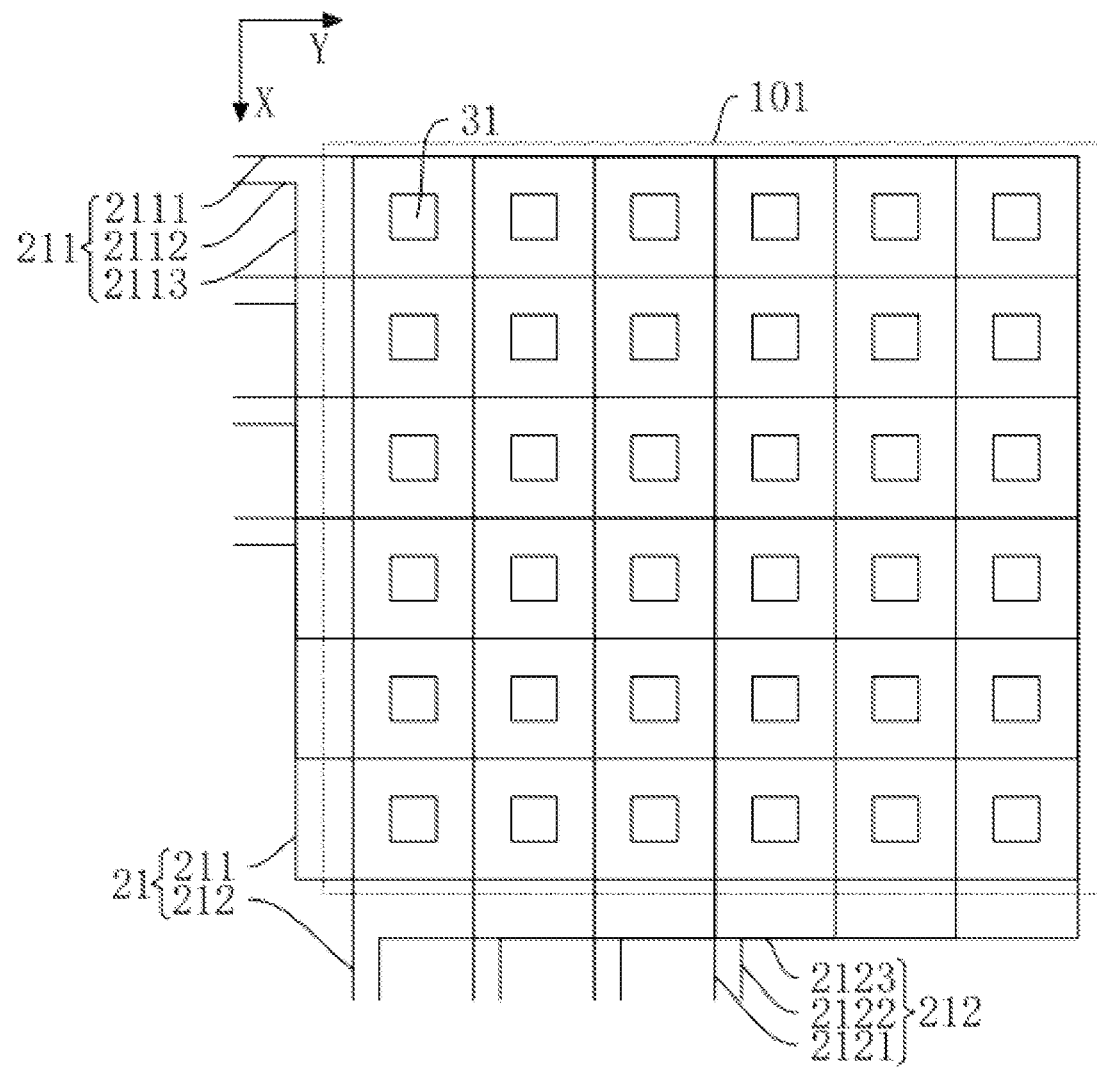
FIG. 2 is a schematic structural view of a planar distribution structure of an electromagnetic induction coil provided by an embodiment of the present application.

The embodiments of the present application provide a display module. Referring to FIGS. 1 and 2. The display module includes a light-emitting backplane, and the light-emitting backplane includes a substrate 10, an electromagnetic induction layer 20, and a light-emitting component layer 30.

The electromagnetic induction layer 20 is arranged on the substrate 10 for receiving electromagnetic signals. The light-emitting component layer 30 is arranged on the electromagnetic induction layer 20, and the light-emitting component layer 30 includes a plurality of light-emitting components 31 distributed in an array along a first direction X and a second direction Y intersecting with each other.

Furthermore, the electromagnetic induction layer 20 includes a plurality of first electromagnetic induction coils 211 arranged in the first direction X and extending to the second direction Y, and a plurality of second electromagnetic induction coils 212 arranged in the second direction Y and extending to the first direction X.

In the implementation of the application, the embodiments of the present application can improve the touch effect and touch accuracy by configuring a plurality of first electromagnetic induction coils 211 and a plurality of second electromagnetic induction coils 212 in the substrate 10 of the light-emitting backplane, which can get the touch coordinates of the display module by sensing the magnetic flux change in the induction coils at different positions of the display module. In addition, the substrate 10 of the light-emitting backplane does not need to transmit light, which has a lot of space for routing the electromagnetic induction coils and does not affect the luminescence of the light-emitting backplane. The present application can save the space of the display module for the display module with an integrated touch function, so as to improve the integrated function of the display module.

Specifically, Continuing to refer to FIGS. 1 and 2. The display module includes the substrate 10, the electromagnetic induction layer 20 arranged on the substrate 10, the light-emitting component layer 30 arranged on the electromagnetic induction layer 20, a display panel 40 arranged on the light-emitting component layer 30, and a cover plate 50 arranged on the display panel 40. In other embodiments of the present application, the cover plate 50 may not be provided, which is not limited herein.

The electromagnetic induction layer 20 includes electromagnetic induction coils 21 and light-emitting signal traces 22 arranged on the substrate 10. It should be noted that the substrate 10 may be a glass substrate, or the material of the substrate 10 may also be at least one organic polymer material of polyimide, polymethylmethacrylate, polyethylene terephthalate, polycarbonate, polyethylene naphthalate, cycloolefin copolymer.

Figure 3:
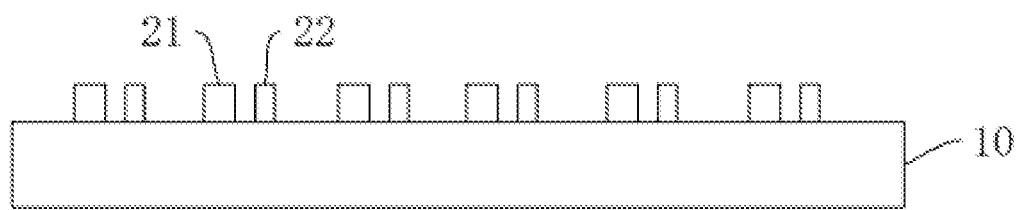
FIG. 3 is a schematic structural view of an electromagnetic induction layer provided by an embodiment of the present application.
Figure 4:
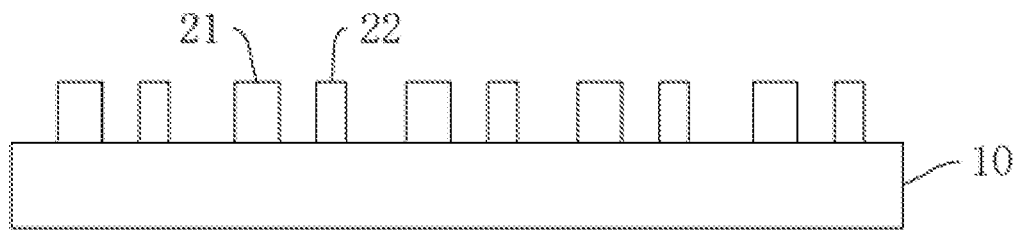
FIG. 4 is a schematic structural view of another electromagnetic induction layer provided by an embodiment of the present application.
Figure 5:
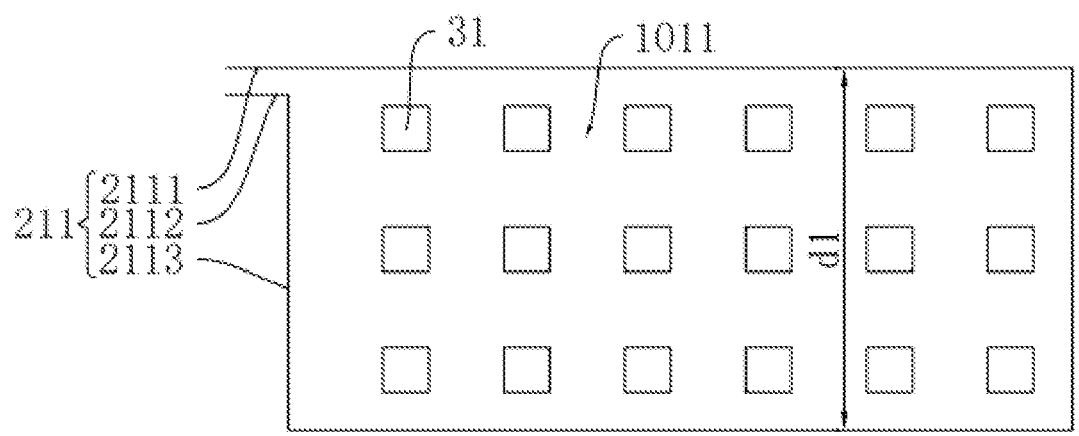
FIG. 5 is a schematic structural view of a first electromagnetic induction coil provided by an embodiment of the present application.
Figure 6:
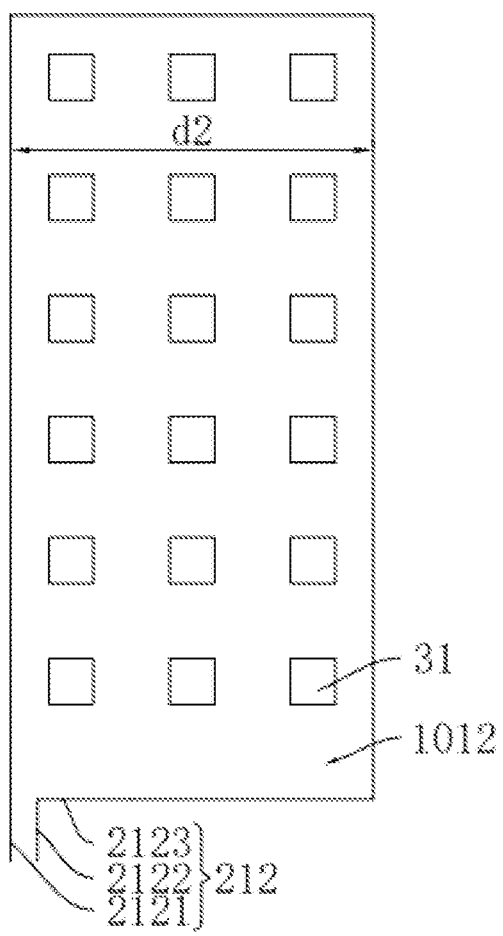
FIG. 6 is a schematic structural view of a second electromagnetic induction coil provided by an embodiment of the present application.

Furthermore, because the material of the substrate 10 is different, and thus the process compatibility of the metal film layer is different, in which, when the substrate 10 is a glass substrate, its compatibility with the metal film layer is low, so the metal film layer prepared thereon should not be too thick, as shown in FIG. 3. When the material of the substrate 10 is the above-mentioned organic polymer materials, it has high compatibility with the metal film, so a thickness of the metal film prepared thereon is relatively thick, as shown in FIG. 4, and the thickness is greater than a thickness of the metal film on the glass substrate. For example, when the substrate 10 is a glass substrate, the thickness of the metal film layer (which may include the electromagnetic induction coils 21 and the light-emitting signal traces 22) prepared thereon ranges between greater than or equal to 0.1 microns and less than or equal to microns. When the material of the substrate 10 includes the above-mentioned organic polymer materials, the thickness of the metal film layer (which may include the electromagnetic induction coils 21 and the light-emitting signal traces 22) prepared thereon ranges between greater than or equal to 1 micron and less than or equal to 100 microns.

Preferably, when the substrate 10 is a glass substrate, the thickness of the metal film layer (which may include the electromagnetic induction coils 21 and the light-emitting signal traces 22) prepared thereon ranges between greater than or equal to 0.5 microns and less than or equal to 3 microns. When the material of the substrate 10 includes the above-mentioned organic polymer materials, the thickness of the metal film layer (which may include the electromagnetic induction coils 21 and the light-emitting signal traces 22) prepared thereon ranges between greater than or equal to 20 microns and less than or equal to 60 microns.

In the embodiments of the present application, the electromagnetic induction coils 21 includes the plurality of first electromagnetic induction coils 211 arranged in the first direction X and extending to the second direction Y, and the plurality of second electromagnetic induction coils 212 arranged in the second direction Y and extending to the first direction X. The first direction X intersects with the second direction Y. Optionally, the first direction X is perpendicular to the second direction Y.

In addition, the display module includes a touch area 101, and each of the first electromagnetic induction coils 211 includes a first end 2111, a second end 2112, and a first winding part 2113 connected between the first end 2111 and the second end 2112, and the first winding part 2113 is located in the touch area 101. Each of the second electromagnetic induction coils 212 includes a third end 2121, a fourth end 2122, and a second winding part 2123 connected between the third end 2121 and the fourth end 2122, and the second winding part 2123 is located in the touch area 101.

In combination with FIGS. 1, 2, 5, and 6, each first winding part 2113 is arranged around a corresponding first electromagnetic induction area 1011, and each second winding part 2123 is arranged around a corresponding second electromagnetic induction area 1012, so as to form a plurality of first electromagnetic induction areas 1011 arranged along the first direction X and a plurality of second electromagnetic induction areas 1012 arranged along the second direction Y in the touch area 101, and any one of the first electromagnetic induction areas 1011 and any of the second electromagnetic induction areas 1012 are arranged in a cross manner and partially overlapped.

Optionally, two of the first electromagnetic induction areas 1011 adjacent along the first direction X partially overlap, and two of the second electromagnetic induction areas 1012 adjacent along the second direction Y partially overlap.

In the embodiments of the present application, the first winding part 2113 is arranged spirally around a corresponding first electromagnetic induction area 1011, and the second winding part 2123 is arranged spirally around a corresponding second electromagnetic induction area 1012. A number of turns of the first winding part 2113 around the corresponding first electromagnetic induction area 1011 is greater than or equal to 1, and a number of turns of the second winding part 2123 around the corresponding second electromagnetic induction area 1012 is greater than or equal to 1.

Figure 7:
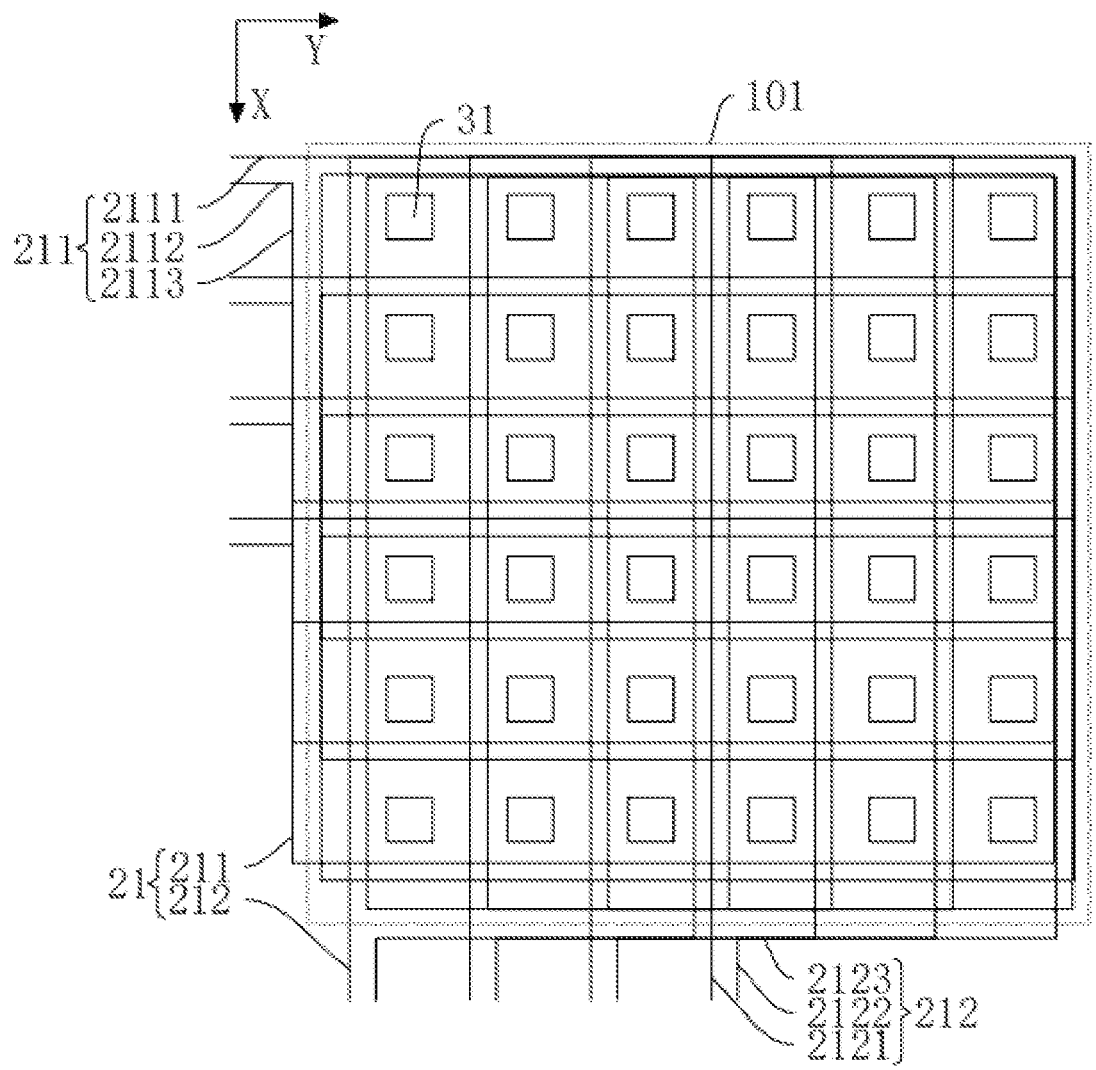
FIG. 7 is a schematic structural view of the planar distribution structure of another electromagnetic induction coil provided by an embodiment of the present application.
Figure 8:
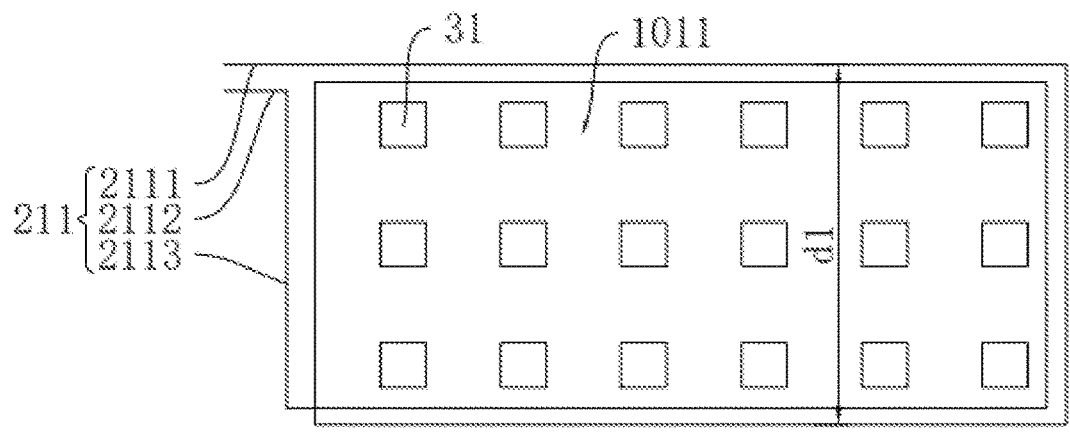
FIG. 8 is a schematic structural view of another first electromagnetic induction coil provided by an embodiment of the present application.
Figure 9:
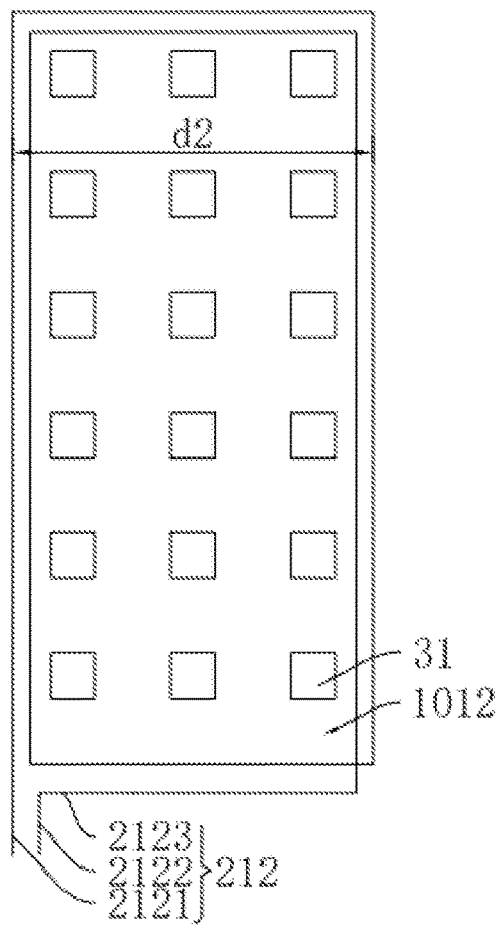
FIG. 9 is a schematic structural view of another second electromagnetic induction coil provided by an embodiment of the present application.

Referring to FIGS. 7, 8, and 9, which are the schematic distribution views of the number of turns of the first winding part 2113 around the corresponding first electromagnetic induction area 1011 greater than or equal to 1, and the number of turns of the second winding part 2123 around the corresponding second electromagnetic induction area 1012 greater than or equal to 1. It can be understood that with the increase of the number of turns of the first winding part 2113 and the second winding part 2123, the magnetic field generated by the electromagnetic induction coils 21 becomes stronger after the voltage is applied to the electromagnetic induction coils 21.

Specifically, the electromagnetic induction layer 20 includes a first side and a second side arranged opposite to each other along the second direction Y, and a third side and a fourth side arranged opposite to each other along the first direction X, in which the light-emitting backplane further includes a plurality of first input terminals and a plurality of first output terminals arranged on the substrate 10 and located on the first side, the first end 2111 of each first electromagnetic induction coil 211 is connected to a corresponding first input terminal, and the second end 2112 of each first electromagnetic induction coil 211 is connected to a corresponding first output terminal.

The light-emitting backplane further includes a plurality of second input terminals and a plurality of second output terminals arranged on the substrate 10 and located on the third side, the third end 2121 of each second electromagnetic induction coil 212 is connected to a corresponding second input terminal, and the fourth end 2122 of each second electromagnetic induction coil 212 is connected to a corresponding second output terminal.

Optionally, the first winding part 2113 of each first electromagnetic induction coil 211 is electrically connected on the second side, and the second winding part 2123 of each second electromagnetic induction coil 212 is electrically connected on the fourth side, so as to improve the touch precision of the edge area in the touch area 101 and reduce the bezel width.

Figure 10:
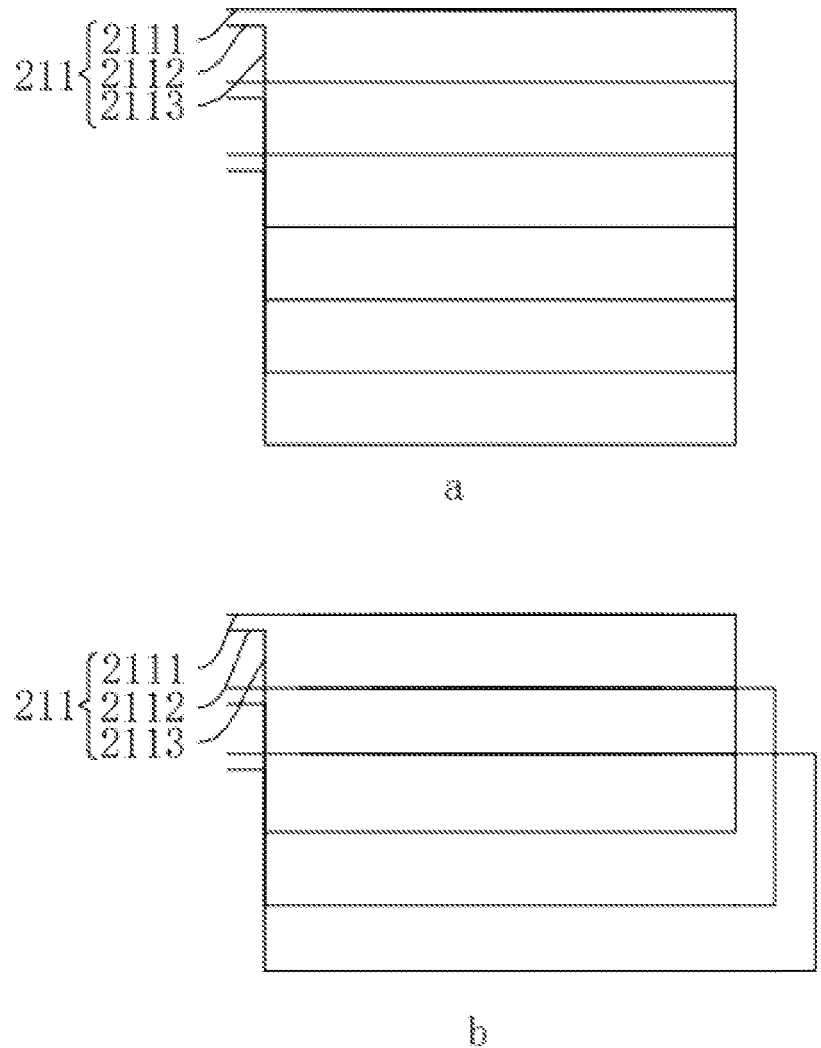
FIG. 10 is a schematic structural view of comparing the short circuit and non-short circuit of the electromagnetic induction coil provided by an embodiment of the present application.

Specifically, when each first winding part 2113 is electrically connected on the second side, as shown in FIG. 10a, each first winding part 2113 is flush distributed on the second side, which can reduce the bezel width, and the length is the same, so that the impedance of each first winding part 2113 is the same, and the resulting signal strength is the same, so as to improve the sensing precision of the electromagnetic induction layer 20. When the first winding parts 2113 are insulated on the second side, as shown in FIG. 10b, the first winding parts 2113 are not flush on the second side, and the length of each first winding part 2113 increases from top to bottom, which increases the bezel width of the display module, which is not conducive to the narrow bezel display. In addition, the length of each of the first winding parts 2113 is different, and the impedance is also different, so that the resulting signal strength is also different, which will affect the sensing precision of the electromagnetic induction layer 20. It can be understood that the embodiments of the present application only show the arrangements of the first electromagnetic induction coils 211 as examples, while the second induction coils 212 are illustrated in the same way.

Furthermore, in the embodiments of the present application, the light-emitting component layer 30 includes a plurality of light-emitting components 31 distributed in an array along the first direction X and the second direction Y. Optionally, the light-emitting components 31 may be a mini LED lighting or a micro-LED lighting. The routing extension paths of the first winding parts 2113 and the second winding parts 2123 may be arranged between adjacent light-emitting components 31. Namely, the first winding parts 2113 and the second winding parts 2123 may be arranged around the light-emitting components 31.

Specifically, the light-emitting component layer 30 includes a plurality of first light-emitting component groups arranged along the first direction X and a plurality of second light-emitting component groups arranged along the second direction Y, each of the first light-emitting component groups includes a plurality of the light-emitting components 31 arranged along the second direction Y, and each of the second light-emitting component groups includes a plurality of the light-emitting components 31 arranged along the first direction X.

Each first electromagnetic induction area 1011 is provided with at least one first light-emitting component group arranged along the first direction X, and each second electromagnetic induction area 1012 is provided with at least one second light-emitting component group arranged along the second direction Y. Namely, each first electromagnetic induction area 1011 is provided with at least one row of light-emitting components 31 arranged along the first direction X, and each second electromagnetic induction area 1012 is provided with at least one column of light-emitting components 31 arranged along the second direction Y.

In the embodiments of the present application, each first electromagnetic induction coil 211 surrounds a plurality of rows of the light-emitting components 31, each second electromagnetic induction coil 212 surrounds a plurality of columns of the light-emitting components 31, each row of the light-emitting components 31 is correspondingly provided with a first input terminal and a first output terminal, and each column of light-emitting components 31 is correspondingly provided with a second input terminal and a second output terminal. However, the figures provided by the embodiments of the present application only illustrate some of the input terminals, output terminals, and some of the electromagnetic induction coils 21 as examples.

In the driving process of the electromagnetic induction coils 21, the voltage can be sequentially applied to each first input terminal from top to bottom along the first direction X, i.e. a first input terminal corresponding to the first row of first light-emitting components 31 is energized while a corresponding first output terminal is energized, so that the first electromagnetic induction coils 211 corresponding to the first row of light-emitting components 31 generates a magnetic field. Then, a first input terminal corresponding to the second row of the first light-emitting components 31 is energized while a corresponding first output terminal is energized, so that the first electromagnetic induction coils 211 corresponding to the second row of light-emitting components 31 generates a magnetic field, and the driving of the first electromagnetic induction coils 211 can be sequentially conducted along the first direction X. Similarly, the voltage can be sequentially applied to each second input terminal from left to right, i.e. a second input terminal corresponding to the first column of first light-emitting components 31 is energized while a corresponding second output terminal is energized, so that the second electromagnetic induction coils 212 corresponding to the first column of light-emitting components 31 generates a magnetic field. Then, a second input terminal corresponding to the second column of the first light-emitting components 31 is energized while a corresponding second output terminal is energized, so that the second electromagnetic induction coils 212 corresponding to the second column of light-emitting components 31 generates a magnetic field, and the driving of the second electromagnetic induction coils 212 can be sequentially conducted along the second direction Y.

Furthermore, in the formula $\phi=nBS$, in which $\phi$ is magnetic flux, n is a number of turns around the electromagnetic induction coil 21, B is a generated magnetic field strength, and S is an enclosed area of each electromagnetic induction coil 21. According to the above formula, after multiple electromagnetic induction coils 21 are distributed in the touch area 101, the touch position can be sensed by sensing the change of magnetic flux in the enclosed area of each electromagnetic induction coil 21.

Specifically, in combination with FIGS. 5, 6, 8, 9, 11, 12, 13, and 14, the display module provided by the embodiments of the present application may also include a touch element 60, such as a stylus pen, etc. The touch element 60 is used to generate a magnetic field, and then when the touch element is touched, the magnetic flux in the area surrounded by each electromagnetic induction coil 21 can be changed. When the magnetic flux in the enclosed area of each electromagnetic induction coil 21 changes, the voltage in the electromagnetic induction coil 21 also changes, and then the touch position of the touch element 60 can be obtained.

It should be noted that in the embodiments of the present application, as shown in FIGS. 5, 6, 8, and 9, a width d1 of each first winding part 2113 in the first direction X and a width d2 of the second winding part 2123 in the second direction Y range between greater than or equal to 10 mm and less than or equal to 80 mm. It can be understood that the larger the width of the first winding part 2113 in the first direction X is, the larger the area of the first electromagnetic induction area 1011 surrounded by the first winding part 2113 is, and the greater the number of rows of the light-emitting components 31 therein is. The larger the width of the second winding part 2123 in the second direction Y is, the larger the area of the second electromagnetic induction area 1012 surrounded by the second winding part 2123 is, and the greater the number of columns of the light-emitting components 31 therein is.

Furthermore, when the area of the first electromagnetic induction area 1011 and the second electromagnetic induction area 1012 is too large, it reduces the touch precision, while when the area of the first electromagnetic induction area 1011 and the second electromagnetic induction area 1012 is too small, the magnetic flux passing through therein is small, resulting in difficult to sense. In the embodiments of the present application, it is preferred that the width d1 of each first winding part 2113 in the first direction X and the width d2 of each second winding part 2123 in the second direction Y range between greater than or equal to 20 mm and less than or equal to 50 mm.

It should be noted that in the first direction X, a number of rows of light-emitting components 31 in each first electromagnetic induction coil 211 close to the third side can be multiple rows, while on the fourth side, since it is close to the boundary of the touch area 101, the first electromagnetic induction coils 211 corresponding to the last row of light-emitting components 31 only surrounds that row of light-emitting components 31, and the first electromagnetic induction coils 211 corresponding to the penultimate row of light-emitting components 31 may surround the penultimate row of light-emitting components 31 and the last row of light-emitting components 31. Namely, a width of the first electromagnetic induction area 1011 near the third side along the first direction X may be greater than a width of the first electromagnetic induction area 1011 near the fourth side along the first direction X, and similarly, a width of the second electromagnetic induction area 1012 near the first side along the second direction Y is greater than a width of the second electromagnetic induction area 1012 near the second side along the second direction Y.

Figure 11:
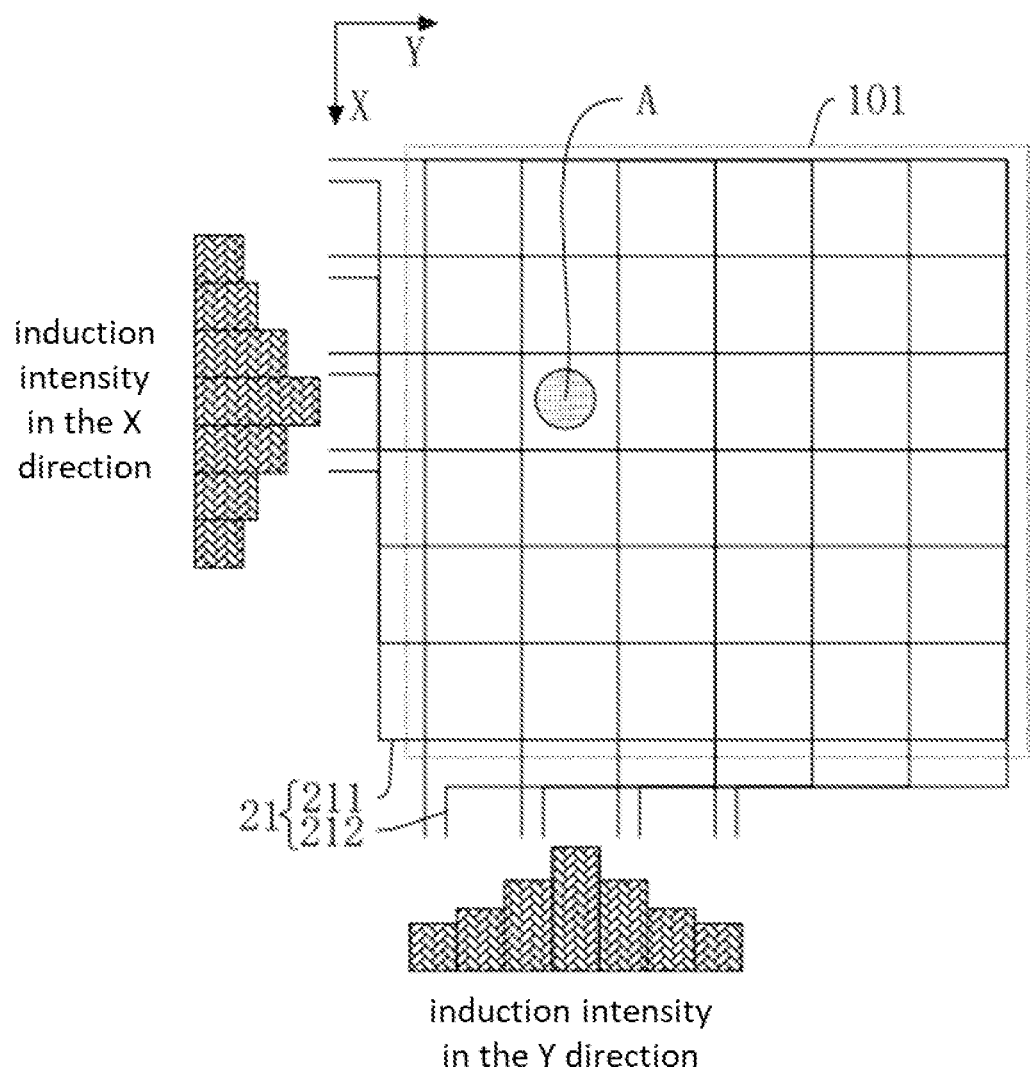
FIG. 11 is a schematic structural view of the touch principle of the electromagnetic induction layer provided by an embodiment of the present application.

Specifically, as shown in FIG. 11, when the touch element 60 is touched, and the touch element 60 is close to the display module, the magnetic field generated by the touch element 60 passes through the electromagnetic induction layer 20, so that the magnetic flux in each electromagnetic induction coil 21 changes. A first electromagnetic induction coil 211 with the largest change in magnetic flux (i.e. induction intensity) in the first direction X can be sensed, and a second electromagnetic induction coil 212 with the largest change in magnetic flux in the second direction Y can also be sensed, so that a position where the first electromagnetic induction coil 211 overlapping with the second electromagnetic induction coil 212 is the touch position A of the touch element 60.

Figure 12:
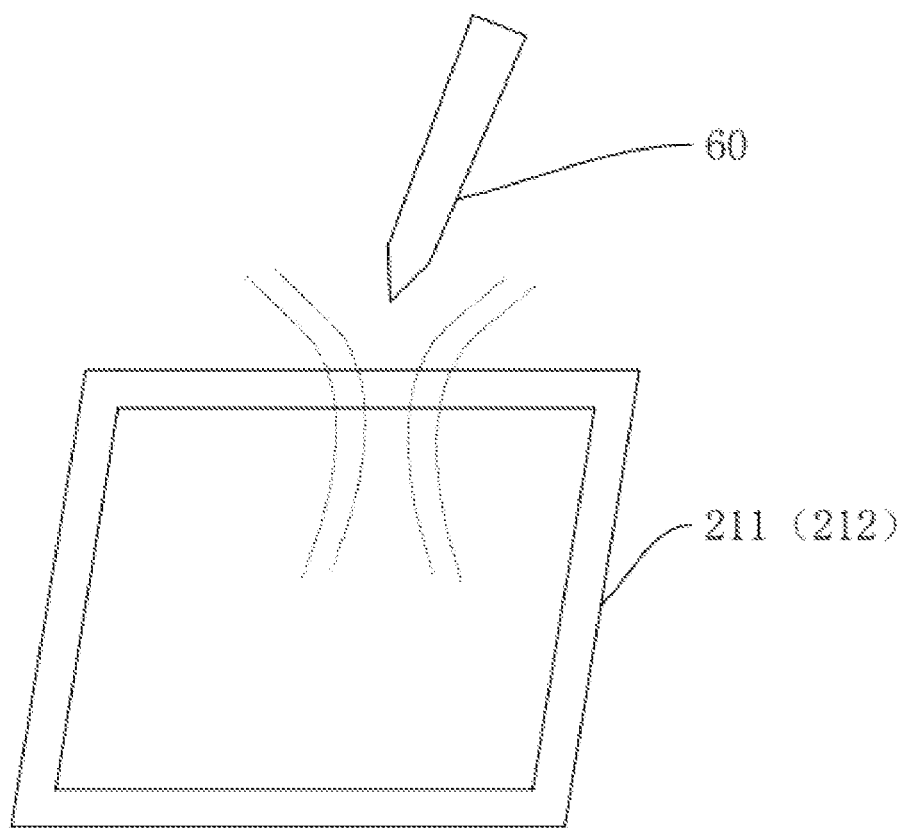
FIG. 12 is a schematic structural view of the induction principle of an electromagnetic induction coil provided by an embodiment of the present application.

Optionally, as shown in FIG. 12, the touch element 60 can be an active stylus pen. Namely, a power supply is arranged in the stylus pen so that it can generate a magnetic field, and then in the touch process, the magnetic field generated by the stylus pen causes a change of the magnetic field in the electromagnetic induction coil 21 to sense the touch position of the stylus pen.

Figure 13:
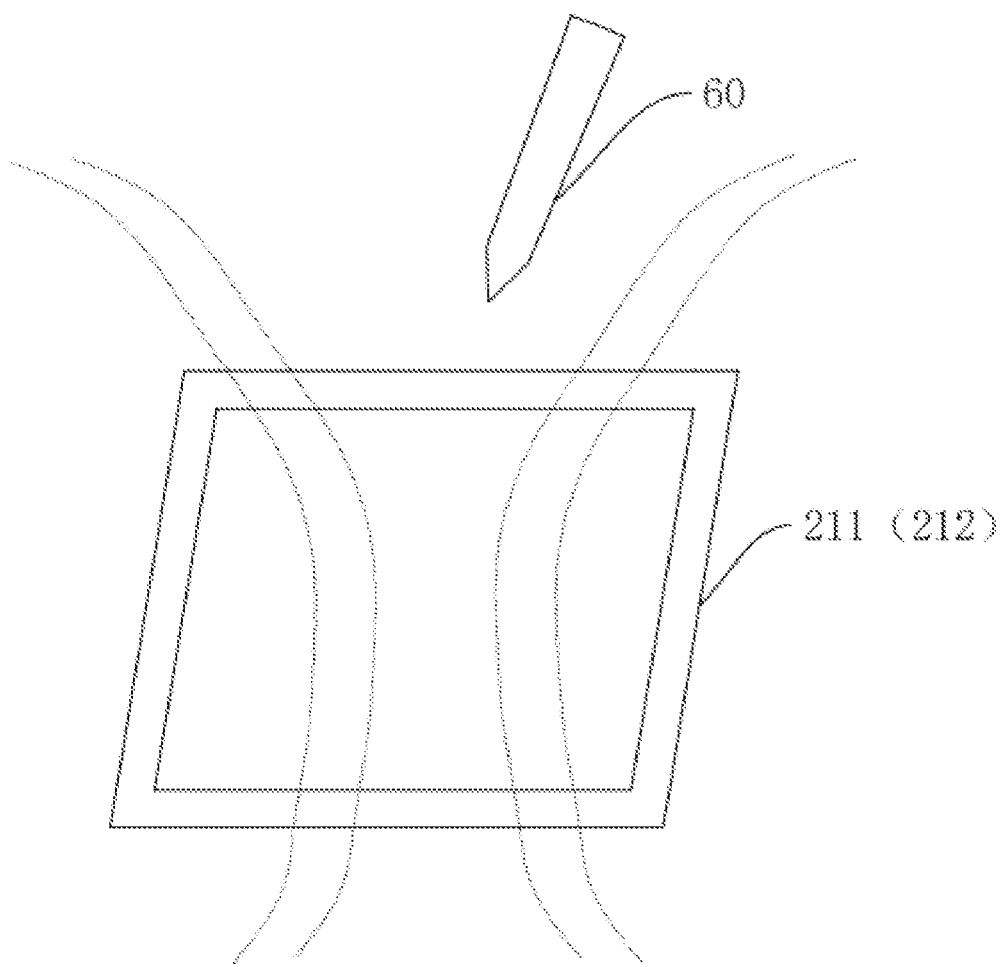
FIGS. 13 and 14 are schematic structural views of the induction principle of another electromagnetic induction coil provided by the embodiment of the present application.
Figure 14:
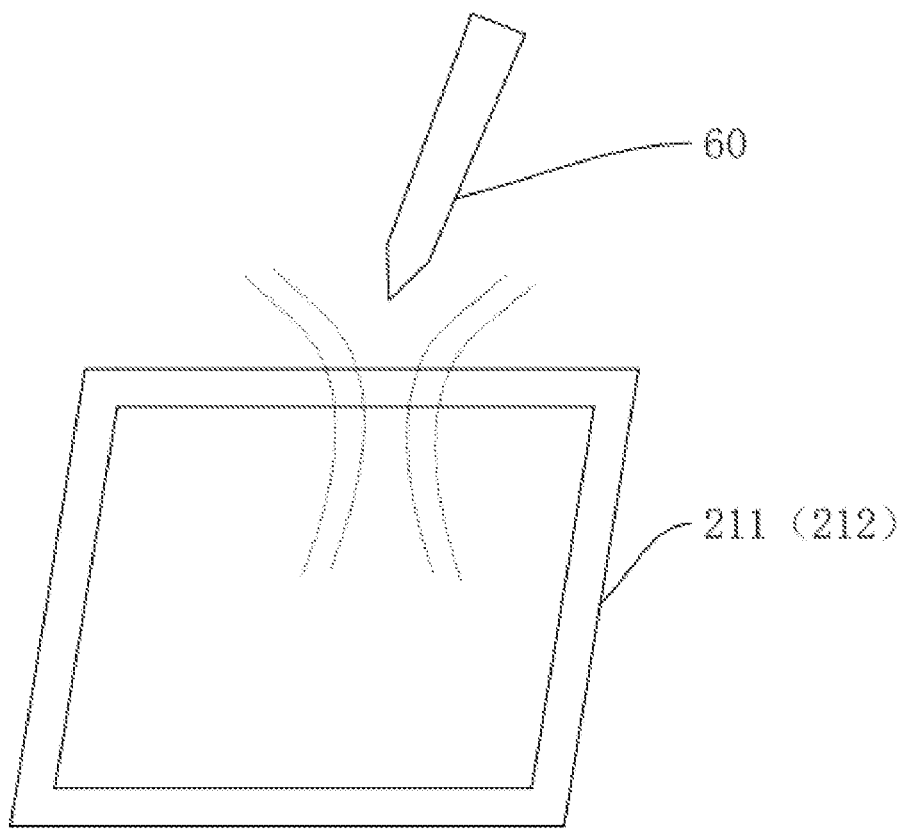
Figure 15:
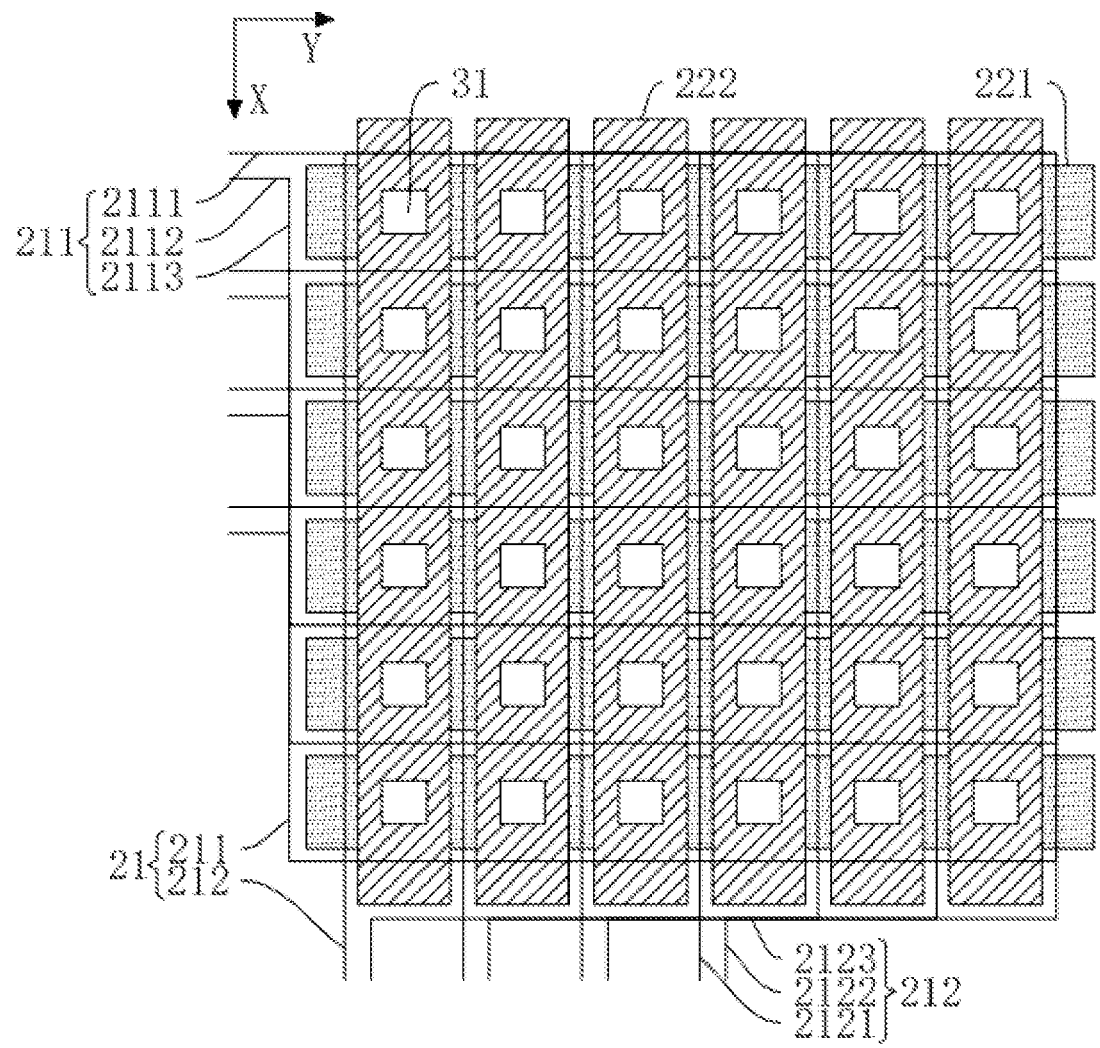
FIG. 15 is a schematic structural view of a planar distribution structure of a light-emitting backplane provided by an embodiment of the present application.

Optionally, as shown in FIGS. 13 and 14, the stylus 60 can be a passive stylus. Namely, the stylus pen cannot actively generate a magnetic field, and an induction coil can be configured in the stylus pen. When each electromagnetic induction coil 21 generates a magnetic field (as shown in FIG. 12), the induction coil in the stylus pen can cut the magnetic induction line, and then the magnetic field can be passively generated (as shown in FIG. 13). Similarly, in the touch process, the magnetic field generated by the stylus pen causes the change of the magnetic field in the electromagnetic induction coil 21 to sense the touch position of the stylus pen.

Specifically, since the active stylus pen can actively generate a magnetic field, the requirement for the magnetic field strength generated by the electromagnetic induction coil 21 is relatively small, while the passive stylus pen needs to passively generate a magnetic field according to the magnetic field generated by the electromagnetic induction coil 21, the passive stylus pen has higher requirements for the magnetic field strength of the electromagnetic induction coil 21, so a number of turns around the electromagnetic induction coil 21 in the display module corresponding to the passive stylus pen is greater than a number of turns around the electromagnetic induction coil 21 in the display module corresponding to the active stylus pen.

Optionally, the number of turns around the electromagnetic induction coil 21 in the display module corresponding to the active stylus pen ranges between 1 to 5, while the number of turns around the electromagnetic induction coil 21 in the display module corresponding to the passive stylus pen ranges between 2 to 10.

In addition, in an embodiment of the present application, in combination with FIGS. 1, 2, 5, 6, and 15, the electromagnetic induction layer 20 includes electromagnetic induction coils 21 and light-emitting signal traces 22. The light-emitting signal traces 22 can be electrically connected to respective light-emitting components 31 to achieve the light-emitting function, while the electromagnetic induction coils 21 can achieve the electromagnetic induction touch function to realize the integration of the display module.

The electromagnetic induction layer 20 further includes a first wiring sublayer arranged on the substrate 10, an insulating layer arranged on the first wiring sublayer, and a second wiring sublayer arranged on the insulating layer. The first electromagnetic induction coils 211 may be arranged in the first wiring sublayer and the second electromagnetic induction coils 212 may be arranged in the second wiring sublayer. In addition, the light-emitting signal traces 22 includes a plurality of first signal traces 221 arranged in the first direction X and extending to the second direction Y, and a plurality of second signal traces 222 arranged in the second direction and extending to the first direction X. The first signal traces 221 are located in the first wiring sublayer, and the second signal traces 222 are located in the second wiring sublayer.

Specifically, when the first electromagnetic induction coil 211 overlaps with the first signal trace 221, a loop can be formed by providing a bridging structure in the second wiring sublayer and connecting with the first electromagnetic induction coil 211 through a via passing through the insulating layer, or connecting with the first signal trace 221 through a via passing through the insulating layer. Specifically, when the second electromagnetic induction coil 212 overlaps with the second signal trace 222, a loop can be formed by providing a bridging structure in the first wiring sublayer and connecting with the second electromagnetic induction coil 212 through a via passing through the insulating layer, or connecting with the second signal trace 222 through a via passing through the insulating layer.

Each light-emitting component 31 is connected to a corresponding first signal trace 221 and a corresponding second signal trace 222. In this embodiment, the light-emitting components 31 can be driven by an active matrix, i.e. the first signal traces 221 may be scanned line by line.

The second signal traces 222 inputs light-emitting signals to control the light and darkness of each light-emitting component 31.

Optionally, a trace width of each first signal trace 221 and a trace width of the second signal trace 222 range between 10 microns to 1000 microns, preferably 200 microns to 600 microns, while an impedance of each first electromagnetic induction coil is less than 5000Ω, and a corresponding trace width ranges between 5 microns to 1000 microns, preferably 100 microns to 1000 microns.

In addition, in this embodiment, the electromagnetic induction coils 21 and the light-emitting signal traces 22 may be driven by the same driving module or by two driving modules respectively.

For example, the light-emitting backplane further includes a first driving module, and both of the electromagnetic induction coils 21 and the light-emitting signal traces 22 are electrically connected to the first driving module, but the electromagnetic induction coils 21 and the light-emitting signal traces 22 may adopt time-sharing driving, i.e., the electromagnetic induction coils 21 are driven in a first period of time, while the light-emitting signal traces 22 are driven in a second period of time, and the first period of time and the second period of time do not overlap.

For another example, the light-emitting backplane further includes a second driving module and a third driving module, the electromagnetic induction coils 21 are electrically connected to the second driving module, and the light-emitting signal traces 22 are electrically connected to the third driving module, but a driving frequency of the electromagnetic induction coils 21 is different from a driving frequency of the light-emitting signal traces 22. Moreover, the driving frequency of the electromagnetic induction coils 21 is different from the driving frequency of the light-emitting signal trace 22 without an integer multiple relationship, so as to prevent electromagnetic interference between the electromagnetic induction coils 21 and the light-emitting signal traces 22.

In this embodiment, a number of coil turns formed by the first winding part 2113 and the second winding part 2123 in each electromagnetic induction coil 21 is 1, and the generated magnetic field is relatively weak. In this embodiment, an active stylus pen can be used for touch control.

Figure 16:
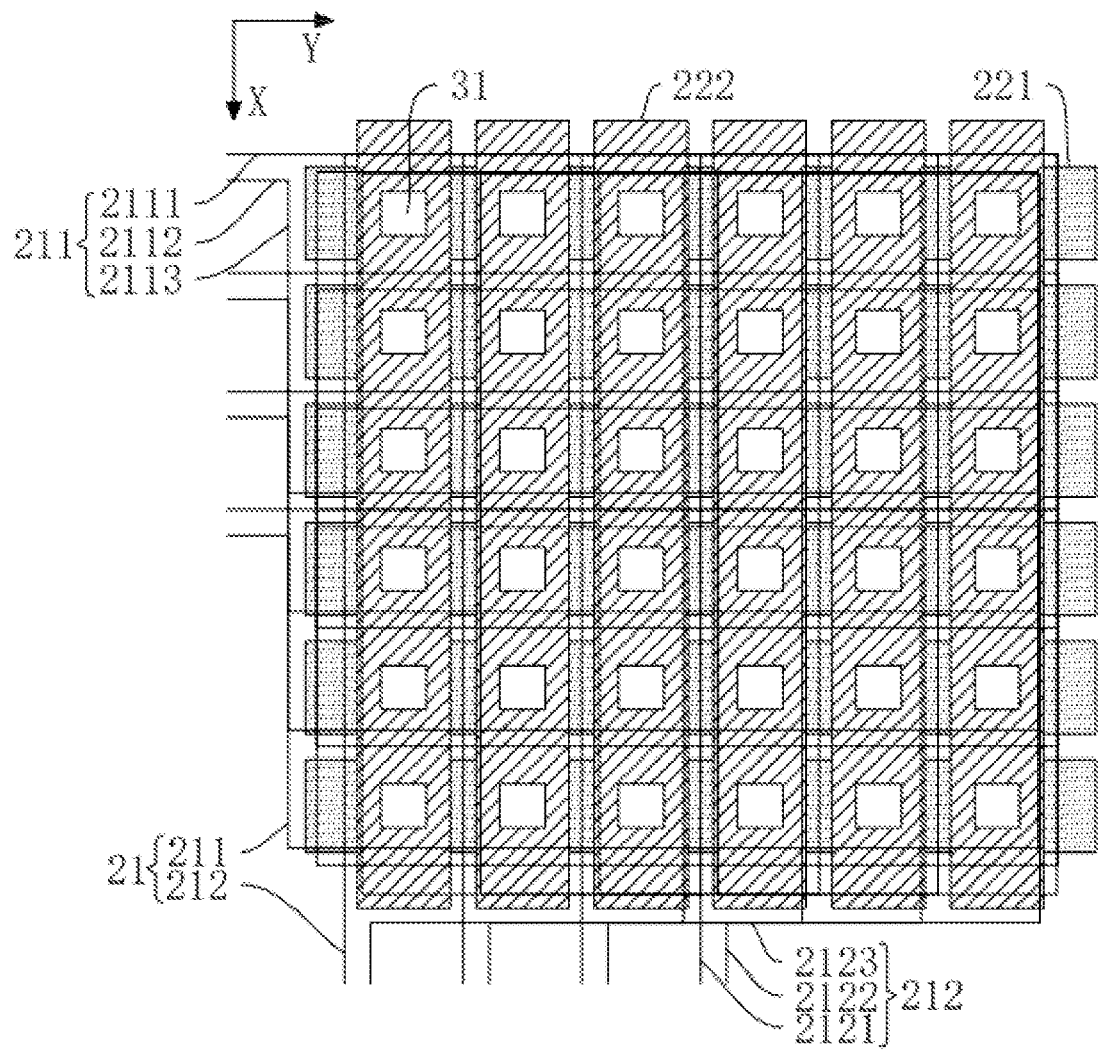
FIG. 16 is a schematic structural view of a planar distribution structure of another light-emitting backplane provided by an embodiment of the present application.

In another embodiment of the present application, referring to FIG. 16, the difference between this embodiment and the previous embodiments is that the number of coil turns formed by the first winding part 2113 and the second winding part 2123 in each electromagnetic induction coil 21 is 2, and the generated magnetic field is relatively strong. In this embodiment, a passive stylus pen can be used for touch control.

Optionally, the trace width of each first signal trace 221 and the trace width of each second signal trace 222 range between 10 microns to 1000 microns. Preferably, the trace width of each first signal trace 221 and the trace width of each second signal trace 222 range between 200 microns to 600 microns. A trace impedance of each electromagnetic induction coil 21 is less than 500Ω, and a corresponding trace width ranges between 100 microns to 3000 microns, preferably 400 microns to 1000 microns.

Figure 17:
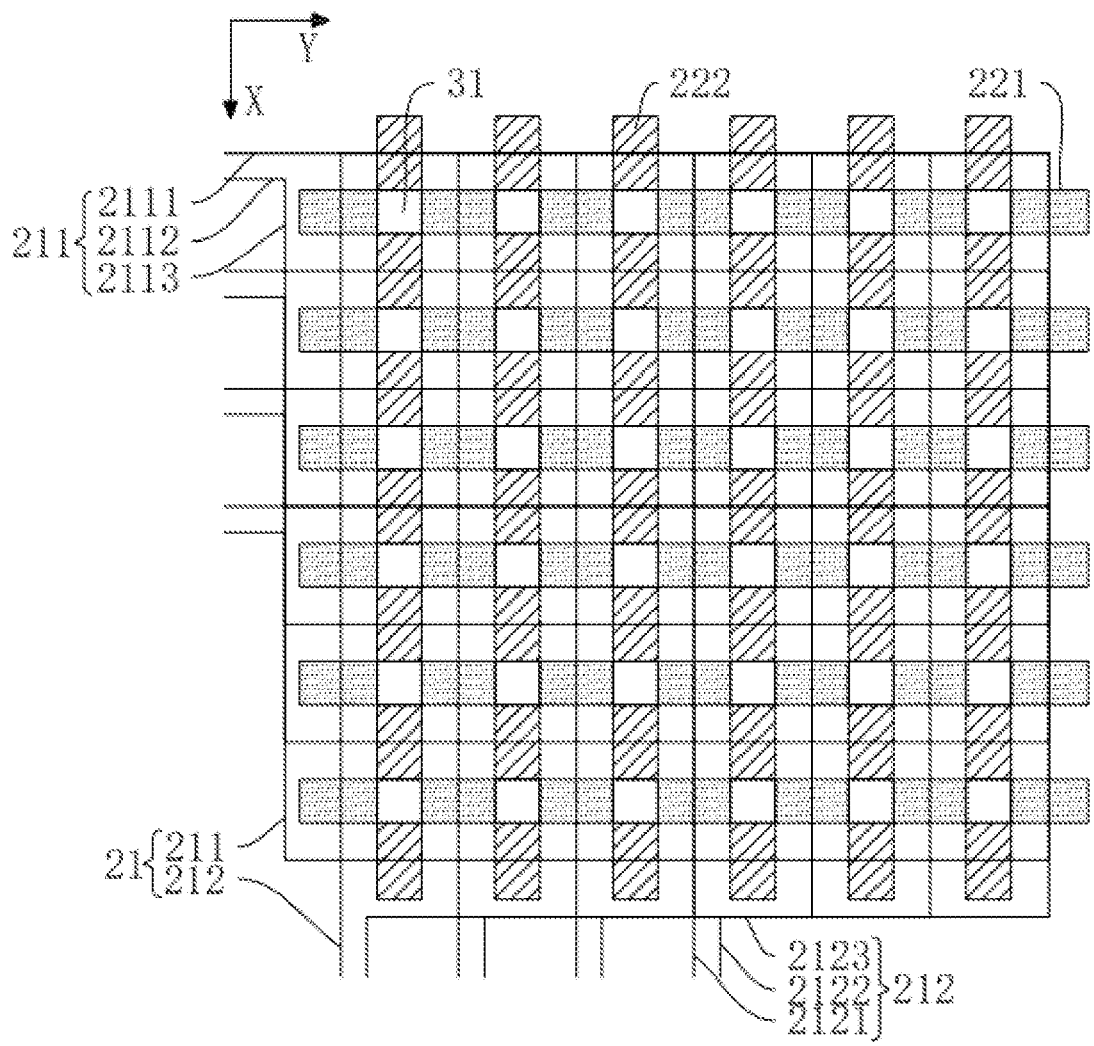
FIG. 17 is a schematic structural view of a planar distribution structure of another light-emitting backplane provided by an embodiment of the present application.

In yet another embodiment of the present application, referring to FIG. 17. The difference between this embodiment and the first embodiment is that the light-emitting components 31 may be driven by a passive matrix, that is, each light-emitting component 31 can be connected to a corresponding first signal trace 221 and a corresponding second signal trace 222. The first signal trace 221 and the second signal trace 222 may be respectively connected to the positive and negative electrodes of a corresponding light-emitting component 31, so that the corresponding light-emitting component 31 emits light.

Moreover, in this embodiment, a number of coil turns of each first winding part 2113 and each second winding part 2123 is 1, and the generated magnetic field intensity is weak. In this embodiment, an active stylus pen can be used for touch control.

Optionally, a trace width of each first signal trace 221 and a trace width of each second signal trace 222 range between 10 microns to 100 microns. Preferably, the trace width of each first signal trace 221 and the trace width of each second signal trace 222 range between 20 microns to 60 microns. The trace impedance of each electromagnetic induction coil 21 is less than 5000Ω, and a corresponding trace width ranges between 5 microns to 1000 microns, preferably 100 microns to 1000 microns.

Figure 18:
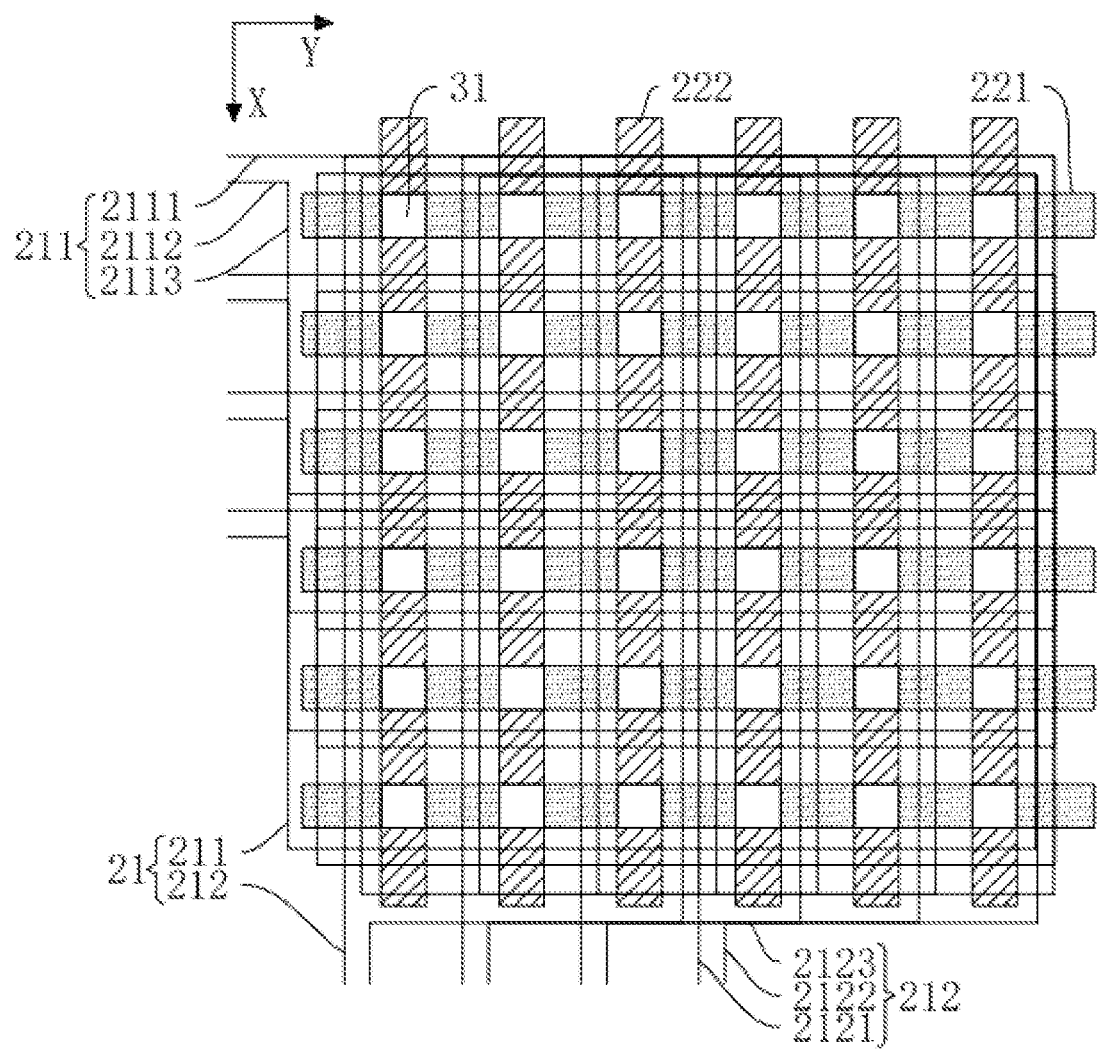
FIG. 18 is a schematic structural view of a planar distribution structure of another light-emitting backplane provided by an embodiment of the present application.

In another embodiment of the present application, referring to FIG. 18, the difference between this embodiment and the previous embodiments is that the number of coil turns formed by each first winding part 2113 and each second winding part 2123 is 2, and the generated magnetic field is relatively strong. In this embodiment, a passive stylus pen can be used for touch control.

Optionally, the trace width of each first signal trace 221 and the trace width of each second signal trace 222 range between 10 microns to 100 microns. Preferably, the trace width of each first signal trace 221 and the trace width of each second signal trace 222 range between 20 microns to 60 microns. A trace impedance of each electromagnetic induction coil 21 is less than 500Ω, and a corresponding trace width ranges between 100 microns to 3000 microns, preferably 400 microns to 1000 microns.

Figure 19:
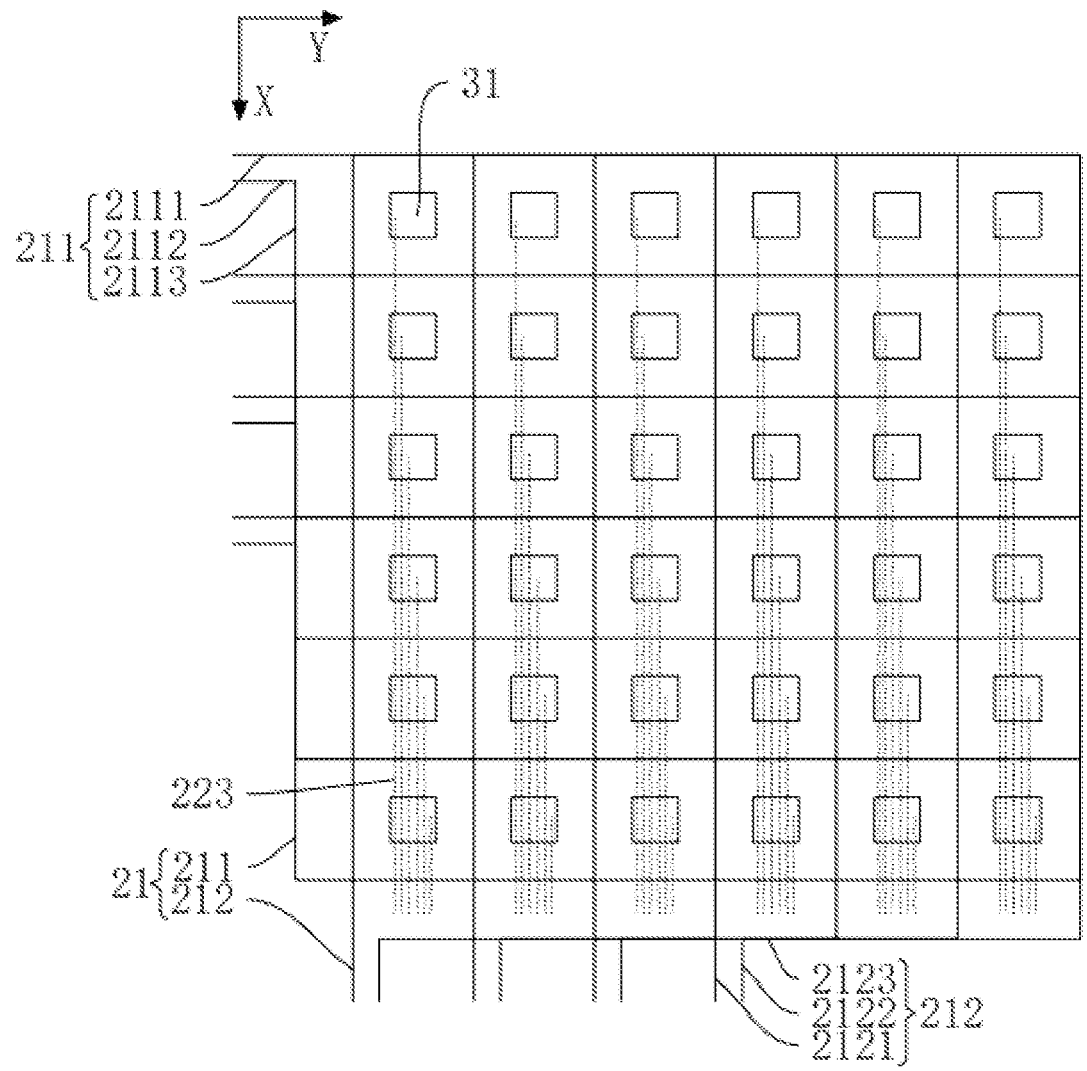
FIG. 19 is a schematic structural view of a planar distribution structure of another light-emitting backplane provided by an embodiment of the present application.

In further another embodiment of the present application, referring to FIG. 19, the difference between this embodiment and the first embodiment is that the driving mode of the light-emitting components 31 in this embodiment is passive dot-matrix driving. The light-emitting signal traces 22 include a plurality of third signal traces 223 arranged along the second direction Y and extending to the first direction X. The third signal traces 223 may be arranged in the second wiring sublayer and arranged on the same layer as the second electromagnetic induction coils 212. In addition, each third signal trace 223 is correspondingly connected to a light-emitting component 31 to drive it to emit light.

In this embodiment, a number of coil turns formed by each first winding part 2113 and each second winding part 2123 is 1, and the generated magnetic field is relatively strong. In this embodiment, an active stylus pen can be used for touch control.

Optionally, a trace width of each third signal trace 223 ranges between 10 microns to 100 microns, preferably, a trace width of each third signal trace 223 ranges between 20 microns to 60 microns. The trace impedance of each electromagnetic induction coil 21 is less than 5000Ω, and a corresponding trace width ranges between 5 microns to 1000 microns, preferably 100 microns to 1000 microns.

Figure 20:
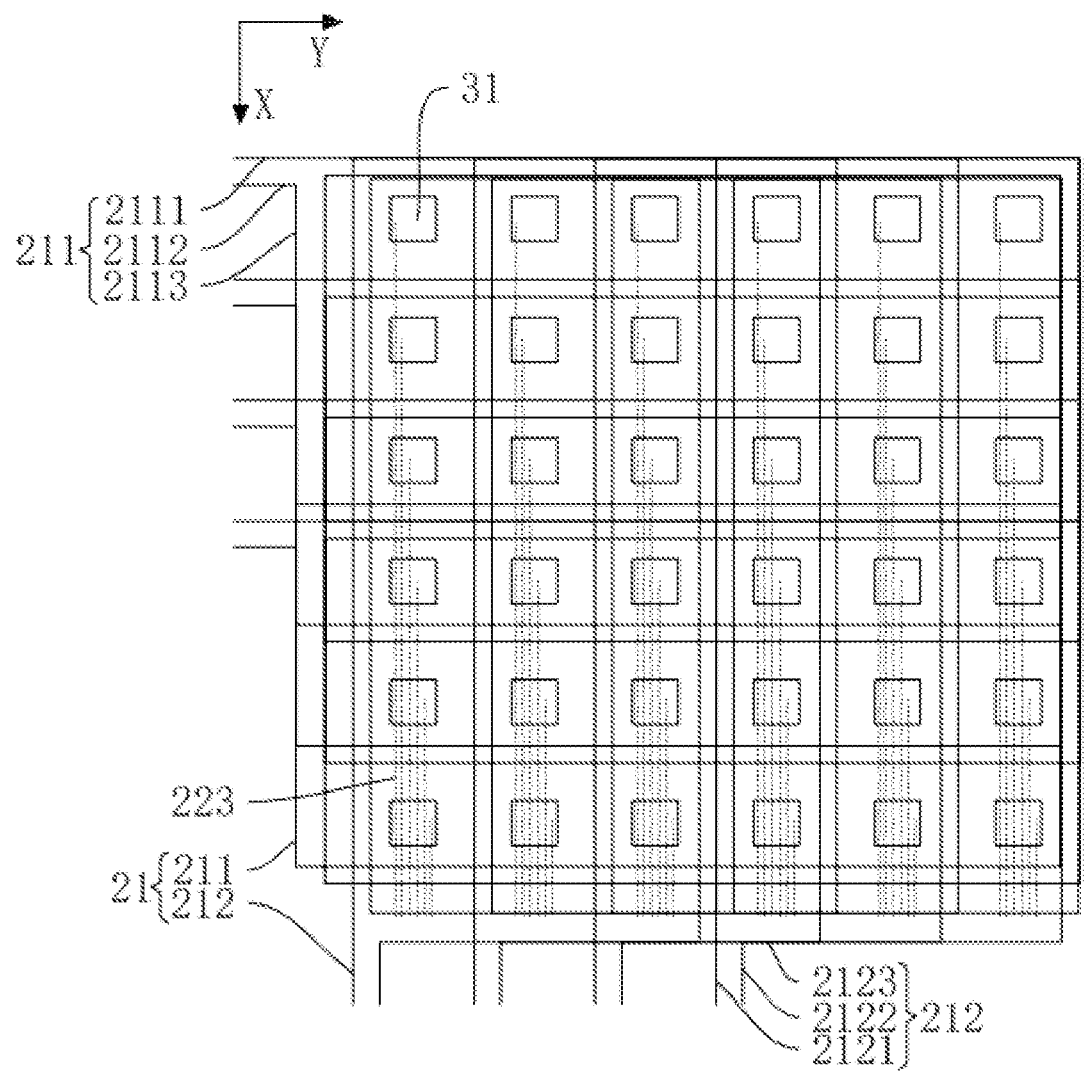
FIG. 20 is a schematic structural view of the planar distribution structure of yet another light-emitting backplane provided by an embodiment of the present application.

In another embodiment of the present application, referring to FIG. 20, the difference between this embodiment and the previous embodiments is that the number of coil turns formed by each first winding part 2113 and each second winding part 2123 is 2, and the generated magnetic field is relatively strong. In this embodiment, a passive stylus pen can be used for touch control.

Optionally, the trace width of each third signal trace 223 ranges between 10 microns to 100 microns. Preferably, the trace width of each third signal trace 223 ranges between 20 microns to 60 microns. A trace impedance of each electromagnetic induction coil 21 is less than 500Ω, and a corresponding trace width ranges between 100 microns to 3000 microns, preferably 400 microns to 1000 microns.

It should be noted that the present application only takes the above embodiments as examples to illustrate the arrangements of the electromagnetic induction coils 21 and the light-emitting signal traces 22, but are not limited to them.

In view of the above, in the implementation of the application, the embodiments of the present application can improve the touch effect and touch accuracy by configuring a plurality of first electromagnetic induction coils 211 and a plurality of second electromagnetic induction coils 212 in the substrate 10 of the light-emitting backplane, which can get the touch coordinates of the display module by sensing the magnetic flux change in the induction coils at different positions of the display module. In addition, the substrate 10 of the light-emitting backplane does not need to transmit light, which has a lot of space for routing the electromagnetic induction coils and does not affect the luminescence of the light-emitting backplane. The present application can save the space of the display module for the display module with an integrated touch function, so as to improve the integrated function of the display module.

In addition, the embodiments of the present application further provide a mobile terminal, which includes the display module described in the above embodiments.

In the above embodiments, the description of each embodiment has its own focus, and the parts that are not described in detail in a particular embodiment can be found in the relevant descriptions of other embodiments.

The above description provides a detailed description of a display module and a mobile terminal provided by the embodiments of the present application, and specific examples have been applied in this text to illustrate the principles and implementation of the present application. The above embodiments are described only to help understand the technical solution of this application and its core ideas. A person of ordinary skill in the art should understand that he/she is still possible to modify the technical solution described in the above embodiments, or to replace some of the technical features. And these modifications or replacements do not make the essence of the corresponding technical solutions out of the scope of the technical solutions of the embodiments of the present application.

What is claimed is:

1. A display module comprises a light-emitting backplane, wherein the light-emitting backplane comprises:
   a substrate;
   an electromagnetic induction layer arranged on the substrate and configured for receiving an electromagnetic signal;
   a light-emitting component layer arranged on the electromagnetic induction layer, and the light-emitting component layer including a plurality of light-emitting components distributed in an array along a first direction and a second direction intersecting with each other;
   wherein the electromagnetic induction layer includes a plurality of first electromagnetic induction coils arranged in the first direction and extending to the second direction, and a plurality of second electromagnetic induction coils arranged in the second direction and extending to the first direction,
   wherein the display module further comprises a touch area, each of the first electromagnetic induction coils comprises a first end, a second end, and a first winding part connected between the first end and the second end, and located in the touch area, and each first winding part is arranged around a corresponding first electromagnetic induction area;
   each of the second electromagnetic induction coils includes a third end, a fourth end, and a second winding part connected between the third end and the fourth end and located in the touch area, and each second winding part is arranged around a corresponding second electromagnetic induction area; and
   a plurality of the first electromagnetic induction areas are arranged in the touch area along the first direction, a plurality of the second electromagnetic induction areas are arranged in the touch area along the second direction, and any one of the first electromagnetic induction areas and any of the second electromagnetic induction areas are arranged in a cross manner and partially overlapped.

2. The display module according to claim 1, wherein two of the first electromagnetic induction areas corresponding to any two adjacent of the first winding parts partially overlap, and two of the second electromagnetic induction areas corresponding to any two adjacent of the second winding parts partially overlap.

3. The display module according to claim 1, wherein the first winding part is arranged spirally around one corresponding of the first electromagnetic induction areas, and the second winding part is arranged spirally around one corresponding of the second electromagnetic induction areas, wherein a number of turns of the first winding part around the corresponding first electromagnetic induction area is greater than or equal to 1, and a number of turns of the second winding part around the corresponding second electromagnetic induction area is greater than or equal to 1.

4. The display module according to claim 1, wherein the light-emitting component layer comprises a plurality of first light-emitting component groups arranged along the first direction and a plurality of second light-emitting component groups arranged along the second direction, each of the first light-emitting component groups comprises a plurality of light-emitting components arranged along the second direction, and each of the second light-emitting component groups comprises a plurality of the light-emitting components arranged along the first direction; and
   wherein at least one of the first light-emitting component groups is arranged in each of the first electromagnetic induction areas, and at least one of the second light-emitting component groups is arranged in each of the second electromagnetic induction areas.

5. The display module according to claim 1, wherein the light-emitting backplane further comprises a plurality of first input terminals and a plurality of first output terminals arranged on the substrate and located on a first side of the electromagnetic induction layer, the first end of each of the first electromagnetic induction coils is connected to a corresponding first input terminal, and the second end of each of the first electromagnetic induction coils is connected to a corresponding first output terminal.

6. The display module according to claim 5, wherein the electromagnetic induction layer further comprises a second side arranged opposite to the first side, and the first winding part of each of the first electromagnetic induction coils is electrically connected on the second side.

7. The display module according to claim 6, wherein the light-emitting backplane further comprises a plurality of second input terminals and a plurality of second output terminals arranged on the substrate and located on a third side of the electromagnetic induction layer, the third end of each of the second electromagnetic induction coils is connected to a corresponding second input terminal, and the fourth end of each of the second electromagnetic induction coils is connected to a corresponding second output terminal.

8. The display module according to claim 7, wherein the electromagnetic induction layer further comprises a fourth side arranged opposite to the third side, and the second winding part of each of the second electromagnetic induction coils is electrically connected on the fourth side.

9. The display module according to claim 8, wherein a width of the first electromagnetic induction area near the third side along the first direction is greater than a width of the first electromagnetic induction area near the fourth side along the first direction, and a width of the second electromagnetic induction area near the first side along the second direction is greater than a width of the second electromagnetic induction area near the second side along the second direction.

10. The display module according to claim 1, wherein a width of each first winding part along the first direction ranges between greater than or equal to 10 mm and less than or equal to 80 mm; and
a width of each second winding part along the second direction ranges between greater than or equal to 10 mm, and less than or equal to 80 mm.

11. The display module according to claim 1, wherein the electromagnetic induction layer comprises a first wiring sublayer, a second wiring sublayer arranged on the substrate, and an insulating layer arranged between the first wiring sublayer and the second wiring sublayer, wherein the first electromagnetic induction coils are at least located in the first wiring sublayer, the second electromagnetic induction coils are at least located in the second wiring sublayer, and the electromagnetic induction layer further comprises light-emitting signal traces arranged in the first wiring sublayer and/or the second wiring sublayer, and the light-emitting signal traces are electrically connected to each of the light-emitting components, respectively.

12. The display module according to claim 11, wherein the light-emitting signal trace comprises a plurality of first signal traces arranged in the first direction and extending to the second direction, and a plurality of second signal traces arranged in the second direction and extending to the first direction, the first signal traces are located in the first wiring sublayer, the second signal traces are located in the second wiring sublayer, and one of the light-emitting components are connected to a corresponding first signal trace and a corresponding second signal trace.

13. The display module according to claim 11, wherein the light-emitting signal trace comprises a plurality of third signal traces arranged in the second direction and extending to the first direction, the third signal traces are located in the second wiring sublayer, and one of the light-emitting components are connected to a corresponding third signal trace.

14. The display module according to claim 11, wherein the light-emitting backplane further comprises a first driving module, and the first electromagnetic induction coils, the second electromagnetic induction coils and the light-emitting signal traces are electrically connected with the first driving module; and
the first electromagnetic induction coils and the second electromagnetic induction coils are driven in a first period of time, the light-emitting signal traces are driven in a second period of time, and the first period of time does not overlap with the second period of time.

15. The display module according to claim 11, wherein the light-emitting backplane further comprises a second driving module and a third driving module, the first electromagnetic induction coils and the second electromagnetic induction coils are electrically connected with the second driving module, and the light-emitting signal traces are electrically connected with the third driving module; and
a driving frequency of the first electromagnetic induction coils and a driving frequency of the second electromagnetic induction coils are both different from a driving frequency of the light-emitting signal traces.

16. The display module according to claim 1, the display module further comprises a display panel arranged opposite to the light-emitting backplane, and the display panel is arranged on a side of the light-emitting component layer away from the electromagnetic induction layer.

17. A mobile terminal, comprising a display module, wherein the display module comprises a light-emitting backplane, and the light-emitting backplane comprises:
a substrate;
an electromagnetic induction layer arranged on the substrate and configured for receiving an electromagnetic signal;
a light-emitting component layer arranged on the electromagnetic induction layer, and the light-emitting component layer including a plurality of light-emitting components distributed in an array along a first direction and a second direction intersecting with each other;
wherein the electromagnetic induction layer includes a plurality of first electromagnetic induction coils arranged in the first direction and extending to the second direction, and a plurality of second electromagnetic induction coils arranged in the second direction and extending to the first direction,
wherein the display module further comprises a touch area, each of the first electromagnetic induction coils comprises a first end, a second end, and a first winding part connected between the first end and the second end, and located in the touch area, and each first winding part is arranged around a corresponding first electromagnetic induction area;
each of the second electromagnetic induction coils includes a third end, a fourth end, and a second winding part connected between the third end and the fourth end and located in the touch area, and each second winding part is arranged around a corresponding second electromagnetic induction area; and
a plurality of the first electromagnetic induction areas are arranged in the touch area along the first direction, a plurality of the second electromagnetic induction areas are arranged in the touch area along the second direction, and any one of the first electromagnetic induction areas and any of the second electromagnetic induction areas are arranged in a cross manner and partially overlapped.

18. The mobile terminal according to claim 17, wherein two of the first electromagnetic induction areas corresponding to any two adjacent of the first winding parts partially overlap, and two of the second electromagnetic induction areas corresponding to any two adjacent of the second winding parts partially overlap.

* * * * *